US011862882B2

(12) United States Patent
Chen

(10) Patent No.: US 11,862,882 B2
(45) Date of Patent: Jan. 2, 2024

(54) TUBULAR HIGH CURRENT FEMALE TERMINAL

(71) Applicant: J.S.T. CORPORATION, Farmington Hills, MI (US)

(72) Inventor: Ping Chen, Farmington Hills, MI (US)

(73) Assignee: J.S.T. CORPORATION, Farmington Hills, MI (US)

(*) Notice: Subject to any disclaimer, the term of this patent is extended or adjusted under 35 U.S.C. 154(b) by 0 days.

(21) Appl. No.: 17/330,837

(22) Filed: May 26, 2021

(65) Prior Publication Data

US 2022/0384974 A1 Dec. 1, 2022

(51) Int. Cl.

*H01R 13/187* (2006.01)
*H01R 31/06* (2006.01)
*H01R 13/11* (2006.01)

(52) U.S. Cl.

CPC ......... *H01R 13/187* (2013.01); *H01R 13/111* (2013.01); *H01R 13/113* (2013.01); *H01R 31/06* (2013.01)

(58) Field of Classification Search

CPC ... H01R 13/187; H01R 13/111; H01R 13/113; H01R 31/06

See application file for complete search history.

(56) References Cited

U.S. PATENT DOCUMENTS 3,573,721 A 4/1971 Teagno
4,083,622 A 4/1978 Neidecker
4,657,335 A 4/1987 Koch
4,720,157 A 1/1988 Nestor
4,934,965 A 6/1990 Buddrus
5,342,226 A * 8/1994 Hayes .................. H01R 13/113 439/850
3,453,587 A 7/1997 Neidecker
(Continued)

FOREIGN PATENT DOCUMENTS

CN 205565077 U 9/2016
CN 109193218 A 1/2019
EP 1428297 B1 3/2007

OTHER PUBLICATIONS

International Search Report for International Application No. PCT/US2021/050939 dated Feb. 17, 2022 (6 sheets).

*Primary Examiner* — Briggitte R. Hammond
(74) *Attorney, Agent, or Firm* — Kratz, Quintos & Hanson, LLP

(57) ABSTRACT

A tubular high current female terminal for mating with a male terminal having an outer terminal, and at least one core terminal. The outer terminal includes at least a mating portion and a termination portion. The core terminal includes a plurality of spring contacts, and preferably, latches for attaching thereof on an elongated opening of the outer terminal. The outer terminal is a seamless preformed tube that extends from the mating portion integrally extending to the termination portion as a single piece. A plurality of tubular high current female terminals may be joined together at termination portions thereof. Also, the tubular high current female terminal may have mating portions at opposing ends thereof, such that the male terminals respectively connected thereto extend at any desired angle. Furthermore, the mating portion may be a cylindric tube for mating with a cylindric male terminal, while the termination portion is attachable to an electrical cable.

23 Claims, 13 Drawing Sheets

(56) References Cited

U.S. PATENT DOCUMENTS

| | | | | |
|---|---|---|---|---|
| 6,203,355 | B1 | 3/2001 | Neblett | |
| 6,672,911 | B2 | 1/2004 | Zhao | |
| 7,442,051 | B2 * | 10/2008 | Jiang | H01R 13/6581 439/76.1 |
| 9,515,403 | B2 * | 12/2016 | Hirakawa | H01R 13/187 |
| 9,608,341 | B2 * | 3/2017 | Saur | H01R 13/187 |
| 9,948,016 | B2 * | 4/2018 | Chen | H01R 13/11 |
| 9,985,376 | B2 * | 5/2018 | Zhang | H01R 13/426 |
| 10,535,943 | B2 | 1/2020 | Szymura | |
| 10,923,846 | B1 | 2/2021 | Raybold | |
| 2001/0018298 | A1 | 8/2001 | Nakamura | |
| 2003/0060090 | A1 | 3/2003 | Allgood | |
| 2006/0014442 | A1 | 1/2006 | Allgood | |
| 2018/0337479 | A1 | 11/2018 | Machida | |

* cited by examiner

TUBULAR HIGH CURRENT FEMALE TERMINAL

BACKGROUND OF THE INVENTION

1. Field of the Invention

In the field of high current electrical terminals, circular type terminals are commonly made available by machining. However, the machining of circular type terminals by the removal of materials in the various parts thereof make the machining process inefficient, low in productivity, and costly. Moreover, blade type female terminals, especially in ultra-high current applications, are very few because of the complexity of the existing designs or structural arrangements of the blade type female terminals, and due to their current carrying capabilities.

With the rapid development of new energy technology, the need for a more efficient, reliable, and less costly high current electrical connection technology have been increasing, especially in the Battery Electric Vehicle (BEV) automotive industry.

This invention is thus generally directed to a tubular high current female terminal. The tubular high current female terminal of this invention is of a low profile, simple, one-piece, and integral tubular construction or structural arrangement, which is applicable for connecting with, e.g., a blade type or a circular pin type male terminal. A one-terminal design or structural arrangement for the tubular high current female terminal of this invention is provided to allow for multiple termination connection options and multiple-direction options when the tubular high current female terminal of this invention is connected to high voltage cables. The tubular high current female terminal of this invention may be made of a pre-formed copper tube or the like. It may be readily manufactured at high precision and with high productivity with a solid and strong structural arrangement or design for guiding, supporting and protecting a substantially flexible spring element of a core terminal inserted and housed therein, so that flexible and multiple contact points can be maintained by the core terminal for reliable connection.

2. Discussion of the Relevant Art

For high current connectors, multiple but independent spring contacts between male and female terminals are required to minimize contact resistance. There are typically two types of terminals used in the industry, which depend on the shapes of the male terminals (i.e., a blade male terminal or a cylindrical male terminal). As for the conventional high current connectors for mating with cylindrical male terminals, the cylindrical outer terminals of the female terminals are primarily made by machining, which is wasteful due to the high material scrap removed during machining and the manufacturing cost is high. There are some cylindrical female terminals made of stamped and formed from metal sheets. However, such cylindrical female terminals are not sufficiently robust, and they readily deform and unable to carry a very high electrical current. As an example, box type female terminals made by stamping and forming for mating with the blade type male terminals exhibit the above-discussed weaknesses or disadvantages derived from the conventional devices.

SUMMARY OF THE INVENTION

The tubular high current female terminal of this invention is generally comprised of an outer terminal and a core terminal housed therein, the core terminal having a plurality of spring elements. The outer terminal is preferably made of a seamless copper tube, and may mate or connect with, for example, either a blade type male terminal or a circular type male terminal. Further, the female terminal may mate or connect with the male terminal in any orientation or direction. A termination portion of the outer terminal may be connected to another electric conductor (e.g., a busbar terminal, a high voltage cable, or the like) by welding, crimping, mechanical fastening, or the like.

DETAILED DESCRIPTION OF THE PREFERRED EMBODIMENTS

Figure 1:
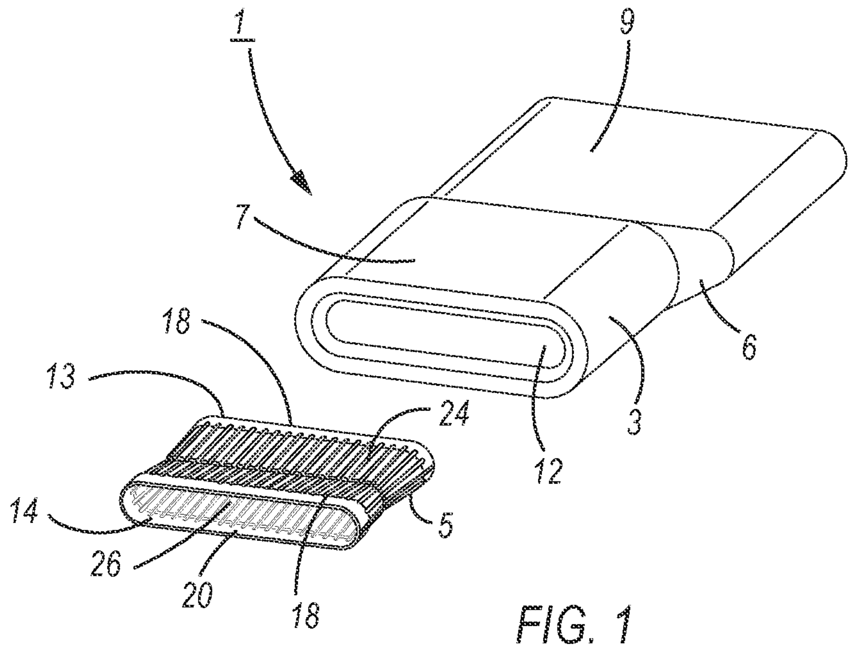
FIG. 1 is a perspective view of a first embodiment of a tubular high current female terminal of this invention having a seamless tubular outer terminal and a core terminal, the outer terminal having an elongated mating portion for receiving therein at least a first type of the core terminal, and further having a termination portion for connecting to a high voltage cable or an electric conductor (e.g., busbar terminal, or the like).

FIG. 1 illustrates the first embodiment of a tubular high current female terminal of this invention, generally referred to as reference number 1, having an outer terminal 3 and a core terminal 5. The outer terminal 3 includes an elongated mating portion 7 and a termination portion 9. The elongated mating portion 7 and the termination portion 9 are integrally linked therebetween through a transit portion 6. The elongated mating portion 7 has a seamless elongated opening 12 for allowing the core terminal 5 to pass therethrough so as to ultimately be accommodated within the elongated mating portion 7, as will later be discussed. As also discussed later, the termination portion 9 is attachable to an electric cable or an electric conductor. Shown in FIG. 1 is first type of the core terminal 5. The term "elongated" is defined herein as a member that has a dimension in which its width is larger than that of its thickness.

The high current female terminal 1 is of a tubular design with an overall profile that can be readily pre-formed with high precision and pre-formed to fit therein an elongated male terminal (for example, as described later, an elongated blade type male terminal or an extended cylindric type male terminal).

Material cut-out 8 in the transit portion 6 is to ease and facilitate the forming process of the mating portion 7 and termination portion 9 with different profiles in the manufacturing of the outer terminal 3.

The outer terminal 3 is preferably a single-piece, low profile, and robust in structure or configuration to guide, support and protect the core terminal 5 upon insertion thereof into the outer terminal 3. The outer terminal 3 is also preferably made of a pre-formed seamless tube without the need for machining, which, as mentioned earlier, is inefficient and low in productivity.

The core terminal 5 includes a plurality of spring contacts 24, 26, as more fully discussed later. The core terminal 5 has, at each of opposing ends thereof, an elongated opening 13, 14 that matches so as to fit inside the elongated opening 12 of the elongated mating portion 7 of the outer terminal 3. Each elongated opening 13, 14 of the core terminal 5 has two longitudinal sides 18, 20 for mating with an elongated blade type male terminal, as also later discussed.

Figure 2:
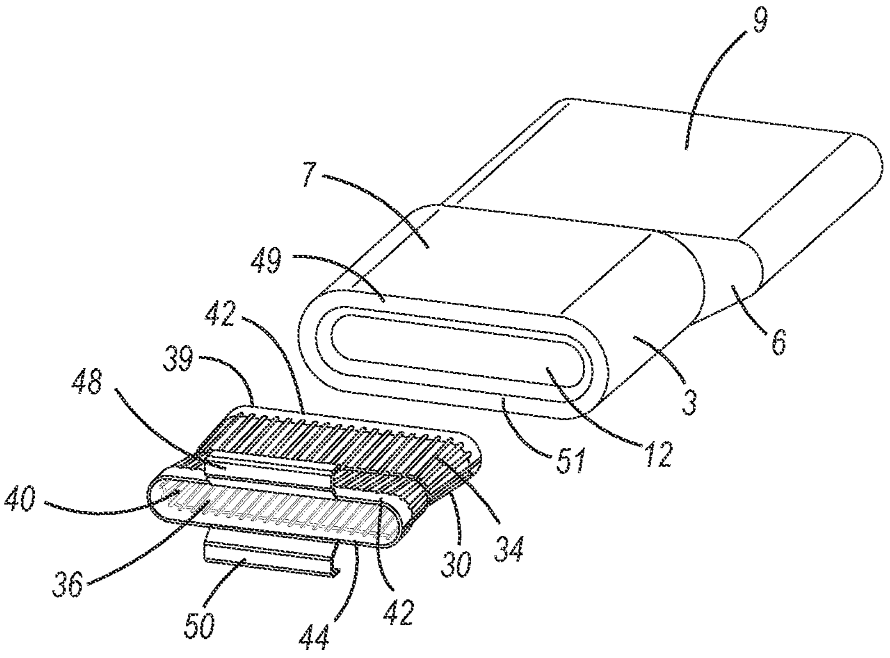
FIG. 2 is a perspective view of the first embodiment of the tubular high current female terminal of this invention having the outer terminal and the core terminal, the outer terminal having the elongated mating portion for receiving therein at least a second type of the core terminal, and further having the termination portion for connecting to the high voltage cable or the electric component.

Shown in FIG. 2 is the first embodiment of the tubular high current female terminal 1 of this invention having similar members or parts, as described above with respect to FIG. 1, except for a core terminal 30 of a second type. Shown in FIG. 2 is the core terminal 30 of the second type having, as with the first type core terminal 5, a plurality of spring contacts 34, 36, and an elongated opening 39, 40 that matches so as to fit inside the elongated opening 12 of the elongated mating portion 7 of the outer terminal 3. Each elongated opening 39, 40 has two longitudinal sides 42, 44 for mating with an elongated blade type male terminal, as also later discussed (see, FIGS. 3 and 4).

Attached to the longitudinal sides 42, 44 of the elongated opening 40 of the core terminal 30 of the second type are latches 48, 50, respectively. As will be discussed later, the latches 48, 50 will be coupled to longitudinal sides 49, 51, respectively, of the elongated opening 12 of the elongated mating portion 7 of the outer terminal 3 upon full insertion of the core terminal 30 of the second type into the elongated mating portion 7.

Figure 3:
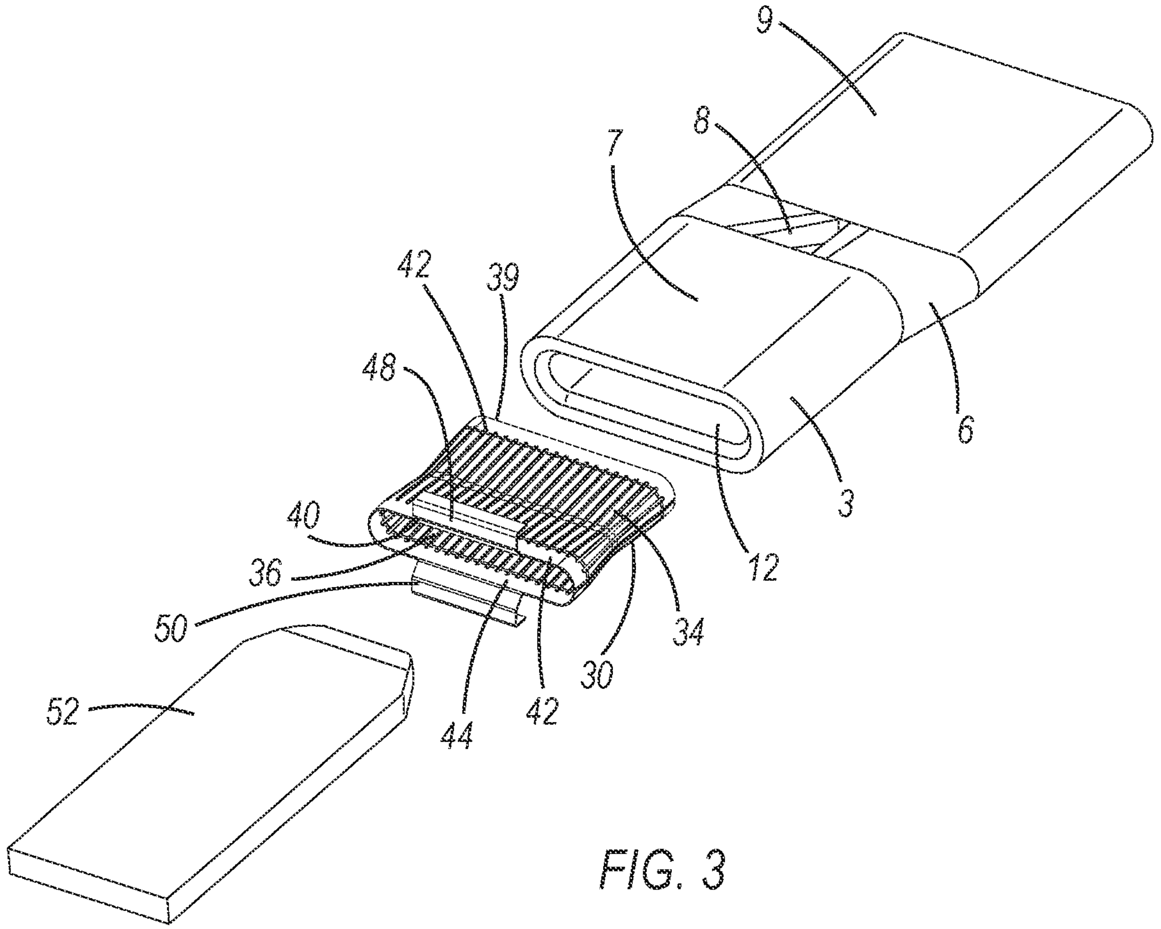
FIG. 3 is an exploded view of the first embodiment of the tubular high current female terminal of this invention illustrating the second type of the core terminal and an elongated blade type male terminal for insertion therein.
Figure 4:
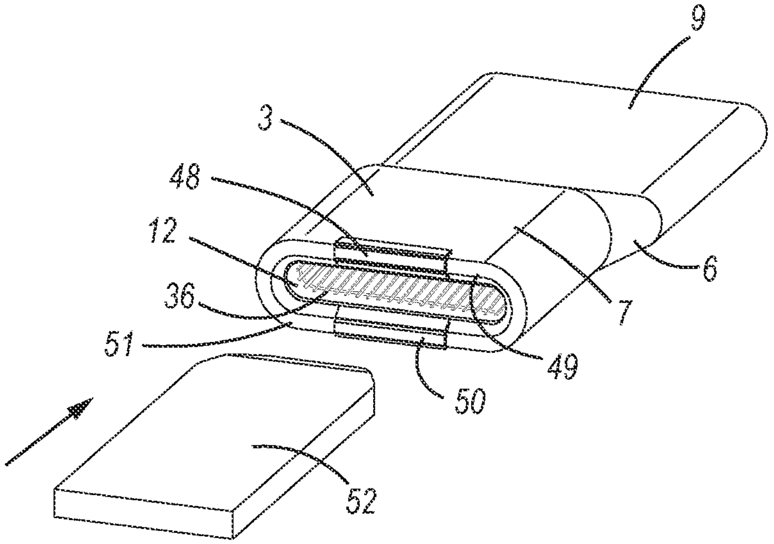
FIG. 4 is an exploded view of the first embodiment of the tubular high current female terminal of this invention with the second type of the core terminal inserted into the elongated mating portion and the elongated blade type male terminal to be inserted into the core terminal.

The tubular high current female terminal 1 of this invention is shown in FIG. 3 illustrating the second type of the core terminal 30 and an elongated blade type male terminal 52 for insertion into the core terminal 30. As shown in FIG. 4, the latches 48, 50 of the core terminal 30 of the second type are attached to the longitudinal sides 49, 51, respectively, of the elongated opening 12 of the elongated mating portion 7 of the outer terminal 3. The spring contacts 36 of the core terminal 30 of the second type are seen through the elongated opening 12 of the elongated mating portion 7. Also shown in FIGS. 3 and 4 are the elongated mating portion 7 and the termination portion 9 being integrally linked therebetween through a transit portion 6.

Figure 5:
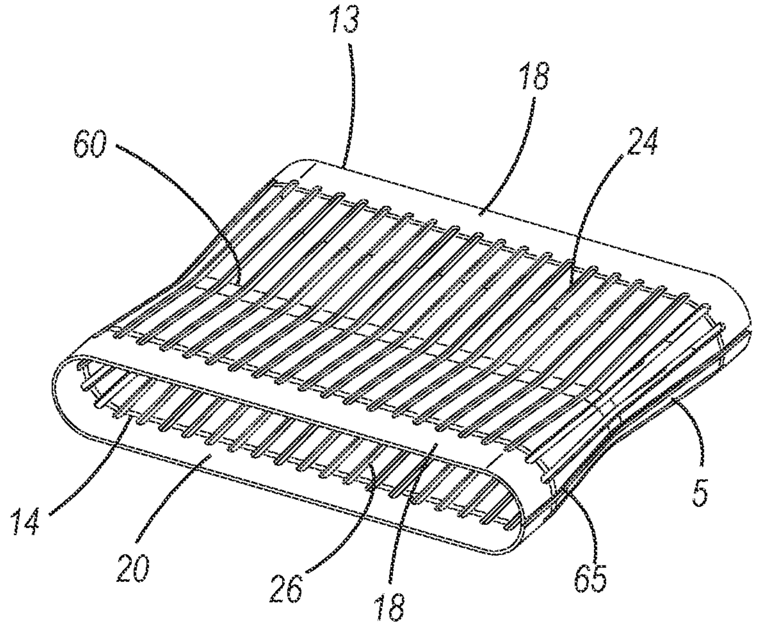
FIG. 5 is a perspective view of the first type of the core terminal having an elongated opening and a plurality of spring contacts for receiving and mating with the blade type male terminal.

FIG. 5 shows the core terminal 5 of the first type having the plurality of spring contacts 24, 26. The core terminal 5 has, at each of opposing ends thereof, an elongated opening 13, 14 that matches so as to fit inside the elongated opening 12 of the elongated mating portion 7 of the outer terminal 3 (see, FIG. 1). Each elongated opening 13, 14 of the core terminal 5 has two longitudinal sides 18, 20 for mating with the elongated blade type male terminal 52. The longitudinal sides 18, 20 of the elongated openings 13, 14 of the core terminal 5 also act as end supports for the plurality of spring contacts 24, 26. In approximately the middle of the longitudinal sides 18, 20 and the plurality of spring contacts 24, 26 is a spring beam 60, which acts as the contact point between the core terminal 5 and the elongated blade type male terminal 52. Maximizing the number of spring contacts 24, 26 ensures the lowest electric contact resistance mating with the elongated blade type male terminal 52.

As further illustrated in FIG. 5, the core terminal 5 has a non-cylindrical geometry to match or correspond with the elongated opening 12 of the elongated mating portion 7 of the outer terminal 3 and to mate with the elongated blade type male terminal 52. Moreover, the core terminal 5, when manufactured, is at first a strip, then formed or folded in a formation, as illustrated in FIG. 5 with a seam 65 extending between the longitudinal sides 18, 20 of the elongated openings 13, 14.

Figure 6:
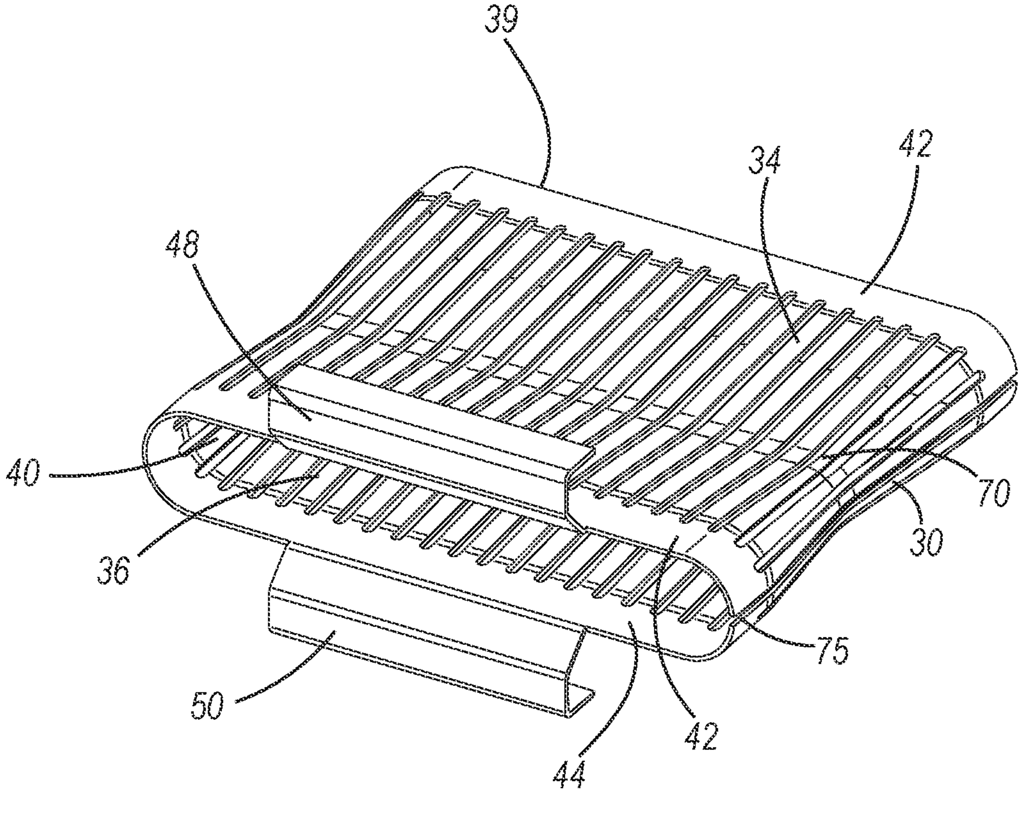
FIG. 6 is a perspective view of the second type of the core terminal having an elongated opening and a plurality of spring contacts for receiving and mating with the blade type male terminal, and further having latch members attached to the elongated opening of the tubular outer terminal.

As described above with respect to the core terminal 5 in FIG. 5, the core terminal 30 in FIG. 6 similarly shows the core terminal 30 of the second type having the plurality of spring contacts 34, 36. The core terminal 30 has, at each of opposing ends thereof, an elongated opening 39, 40 that matches so as to fit inside the elongated opening 12 of the elongated mating portion 7 of the outer terminal 3 (see, FIG. 2). Each elongated opening 39, 40 of the core terminal 30 has two longitudinal sides 42, 44 for mating with the elongated blade type male terminal 52 (see, FIG. 4). Attached to the longitudinal sides 42, 44 of the elongated opening 40 of the core terminal 30 of the second type are latches 48, 50, respectively. Each latch 48, 50 is substantially C-shaped in form or configuration capable of attaching to the longitudinal sides 49, 51, respectively, of the elongated opening 12 of the elongated mating portion 7 of the outer terminal 3 upon full insertion of the core terminal 30 of the second type into the elongated mating portion 7 (see, FIG. 4). The longitudinal sides 42, 44 of the elongated openings 39, 40 of the core terminal 30 also act as end supports for the plurality of spring contacts 34, 36. In approximately the middle of the longitudinal sides 42, 44 and the plurality of spring contacts 34, 36 is a spring beam 70, which acts as the contact point between the core terminal 30 and the elongated blade type male terminal 52. Maximizing the number of spring contacts 34, 36 ensures the lowest electric contact resistance mating with the elongated blade type male terminal 52.

As further illustrated in FIG. 6, the core terminal 30 has a non-cylindrical geometry to match or correspond with the elongated opening 12 of the elongated mating portion 7 of the outer terminal 3 and to mate with the elongated blade type male terminal 52. Moreover, the core terminal 30, when manufactured, is at first a strip, then formed or folded in a formation, as illustrated in FIG. 6 with a seam 75 extending between the longitudinal sides 42, 44 of the elongated openings 39, 40.

Figure 7:
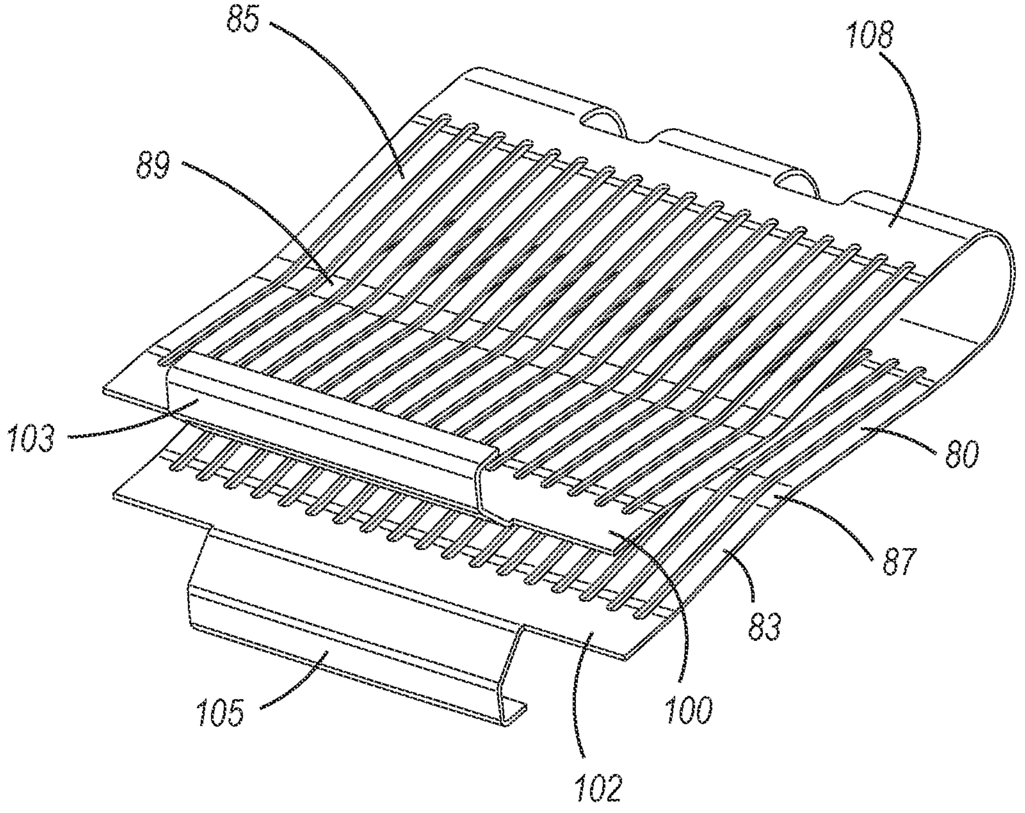
FIG. 7 is a perspective view of the third type of the core terminal, having an elongated opening and a plurality of spring contacts for receiving and mating with the blade type male terminal, showing latch members along the elongated opening, and further showing the core terminal being folded at a leading end in an insertion direction.

FIG. 7 illustrates the third type of the core terminal 80 having a plurality of spring contact beams 83, 85. The core terminal 80 is non-cylindrical. The core terminal 80 is stamped and folded along an insertion direction; that is, an insertion direction toward the elongated opening 12 of the elongated mating portion 7 of the outer terminal 3. Extending across the middle of the plurality of spring contacts 83, 85 are spring beams 87, 89, respectively, which act as the multiple contact points between the core terminal 80 and the elongated blade type male terminal 52. When the stamped core terminal 80 is folded, as shown in FIG. 7, the upper and lower portions of the folded core terminal 80 are substantially symmetrical. At the ends of the core terminal 80 are elongated members 100, 102; and attached to the elongated members 100, 102 are latches 103, 105, respectively. As in the core terminal 30 of the second type, each of the latches 103, 105 of the core terminal 80 of the third type is substantially C-shaped in form or configuration capable of attaching to the longitudinal sides 49, 51, respectively, of the elongated opening 12 of the elongated mating portion 7 of the outer terminal 3 upon full insertion of the core terminal 80 of the third type into the elongated mating portion 7 (see, FIG. 4).

As further illustrated in FIG. 7, the latches 103, 105 have substantially symmetrical features. Also, the latches 103, 105 have lead-in and guide features when the elongated blade type male terminal 52 is inserted into the core terminal 80. The latches 103, 105 also support the insertion force applied by the elongated blade type male terminal 52 upon insertion thereof into the core terminal 80. Furthermore, the latches 103, 105 efficiently position and latch the core terminal 80 inside the elongated mating portion 7 when the latches 103, 105 are attached onto the longitudinal sides 49, 51, respectively, of the elongated opening 12 of the elongated mating portion 7 of the outer terminal 3. An end of the core terminal 80, opposite the latches 103, 105, is a leading end 108, which faces the elongated opening 12 of the elongated mating portion 7 of the outer terminal 3 upon insertion of the core terminal 80, as shown in FIG. 8.

Figure 8:
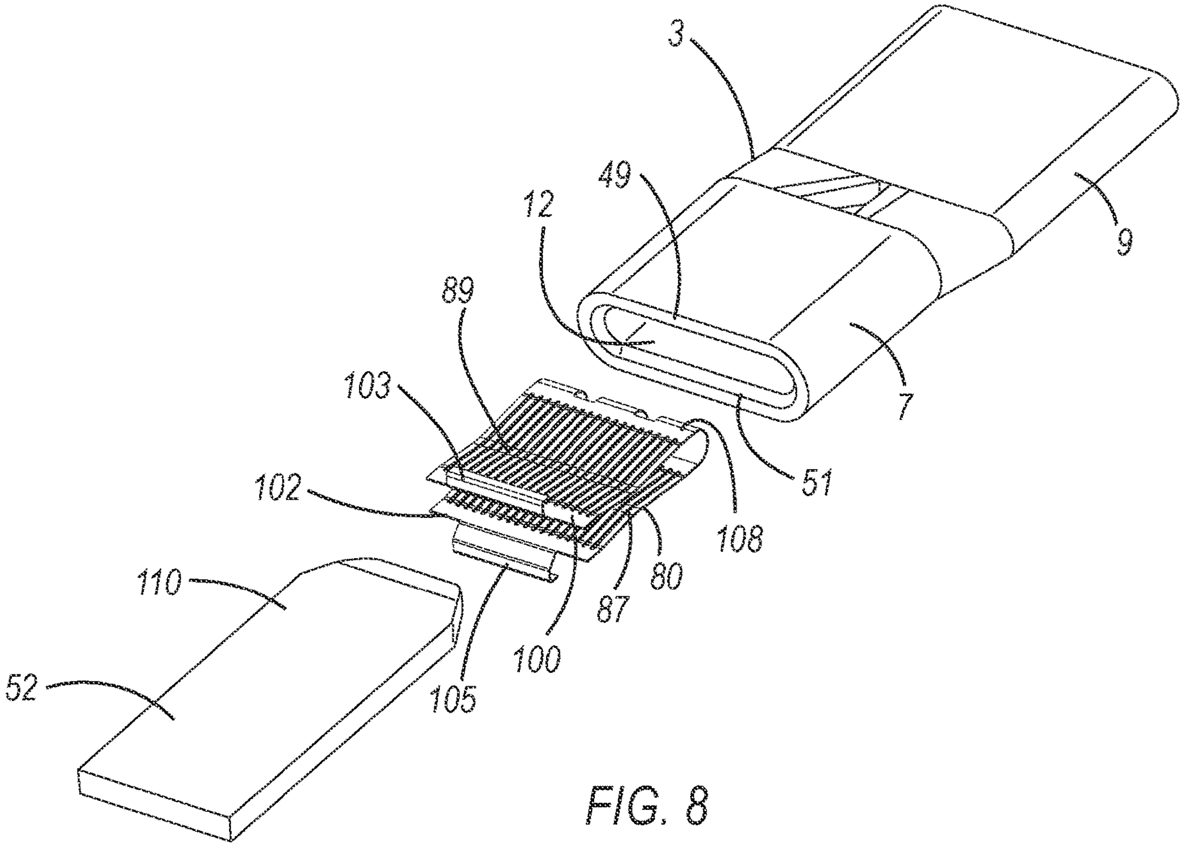
FIG. 8 is an exploded view of the first embodiment of the tubular high current female terminal of this invention illustrating the leading end of the third type of the core terminal for insertion into the elongated mating portion with the elongated blade type male terminal to be inserted into the core terminal.

The leading end 108 of the core terminal 80 is, as can be seen in FIGS. 7 and 8, the folded portion of the originally stamped core terminal 80 and folded at the leading end 108 along the insertion direction towards the elongated opening 12 of the elongated mating portion 7 of the outer terminal 3. In FIG. 8, the leading end 108 of the core terminal 80 of the third type enters the elongated opening 12 of the elongated mating portion 7 of the outer terminal 3. The core terminal 108, in its entirety, enters and is accommodated within the elongated mating portion 7 of the outer terminal 3. Thereafter, the latches 103, 105 efficiently position and latch the core terminal 80 inside the elongated mating portion 7 when the latches 103, 105 are attached onto the longitudinal sides 49, 51, respectively, of the elongated opening 12 of the elongated mating portion 7 of the outer terminal 3. Upon insertion of the core terminal 108 inside the elongated mating portion 7, the core terminal 80 is positioned to accept therein the elongated blade type male terminal 52. During insertion of the elongated blade type male terminal 52, it is lead in and guided by the latches 103, 105 attached to the longitudinal sides 49, 61 of the elongated opening 12 of the elongated portion 7 of the outer terminal 3. The insertion force applied by the elongated blade type male terminal 52 is also supported by the latches 103, 105. Upon full insertion of the elongated blade type male terminal 52 into the core terminal 80, the spring beams 87, 89 that extend across and between the plurality of spring contacts 83, 85 act as the multiple contact points between the core terminal 80 and the elongated blade type male terminal 52. It is preferable that the contact area 110 of the elongated blade type male terminal 52 is elongated in shape to maximize the contacts of the elongated blade type male terminal 52 with the spring beams 87, 89 of the core terminal 80.

Figure 9A:
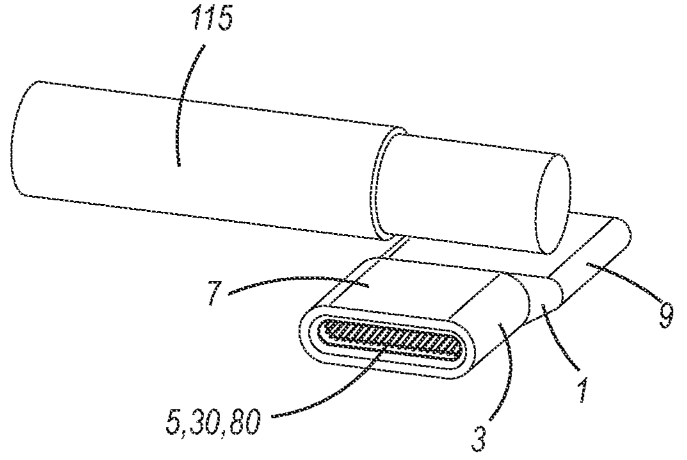
FIG. 9A illustrates the structural arrangement in which the termination portion of the outer terminal of the first embodiment of the tubular high current female terminal of this invention is connected to an electric cable, such that the longitudinal directions along which the tubular high current female terminal and the electric cable extend are perpendicular.
Figure 9B:
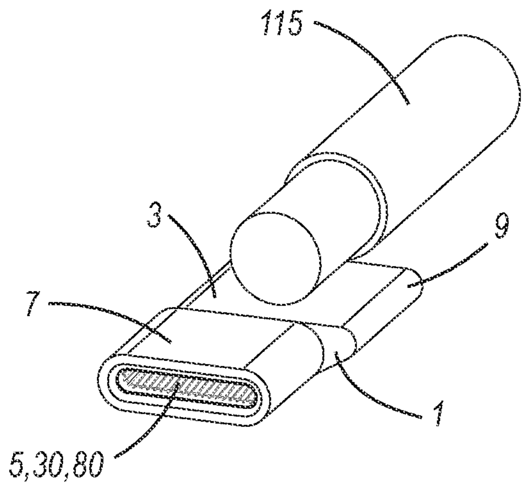
FIG. 9B illustrates the structural arrangement in which the termination portion of the outer terminal of the first embodiment of the tubular high current female terminal of this invention is connected to an electric cable, such that the longitudinal directions along which the tubular high current female terminal and the electric cable extend are parallel.

As discussed above, the first embodiment of the tubular high current female terminal 1 of this invention is comprised of an outer terminal 3 and a core terminal 5, 30, 80. The outer terminal 3 includes the elongated mating portion 7 and the termination portion 9. The termination portion 9 is connected to an electric cable or an electric component 115, as shown in FIG. 9A and FIG. 9B. In FIG. 9A, the termination portion 9 of the outer terminal 3 is connected, by welding, crimping, or mechanical fastening, to an electric cable 115 such that the longitudinal directions along which the tubular high current female terminal 1 and the electric cable 115 extend are perpendicular.

In FIG. 9B, the termination portion 9 of the outer terminal 3 is connected, by welding, crimping, or mechanical fastening, to the electric cable 115 such that the longitudinal directions along which the tubular high current female terminal 1 and the electric cable 115 extend are parallel.

Figure 10:
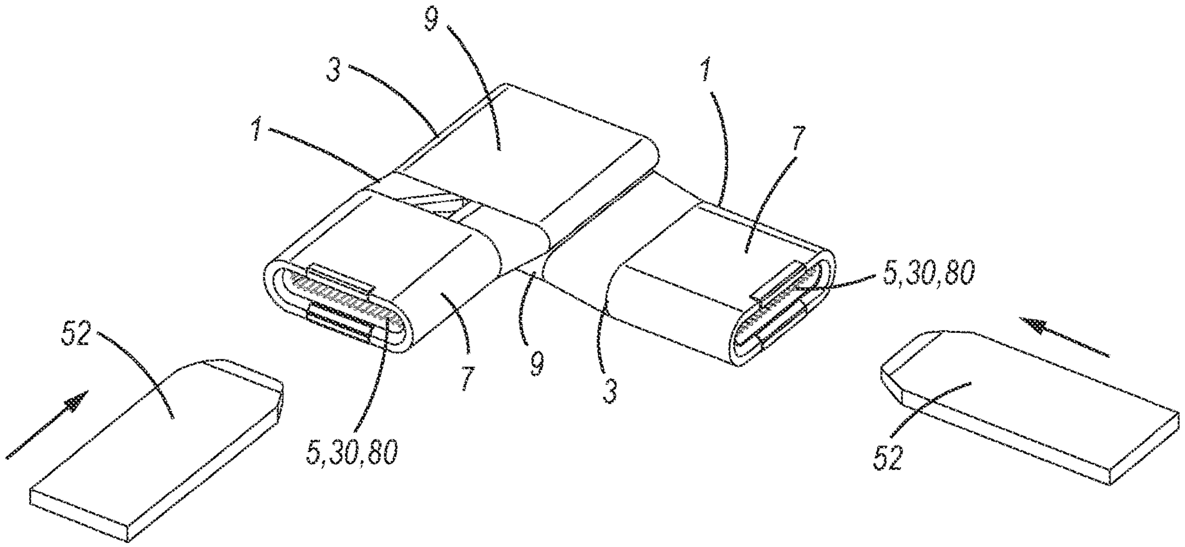
FIG. 10 illustrates the structural arrangement in which the termination portions of the outer terminals of two tubular high current female terminals of this invention are fastened together such that the longitudinal directions or insertion directions of the two male terminals along which the tubular high current female terminals extend are perpendicular.

As discussed above with respect to, for example, FIG. 4, the tubular high current female terminal 1 is comprised of the outer terminal 3 and the core terminal 5, 30, 80. The outer terminal 3 includes the elongated mating portion 7 and the termination portion 9 with the elongated mating portion 7 housing therein the core terminal 5, 30, 80. In FIG. 10, the termination portions 9 of the outer terminals 3 of two tubular high current female terminals 1 of the first embodiment of this invention are fastened together, by welding or mechanical fastening (such as, bolting) so that the longitudinal directions along which the tubular high current female terminals 1 extend are perpendicular. With the above-discussed structural arrangement, as illustrated in FIG. 10, the elongated blade type male terminals 52, which respectively mate with the core terminals 30, 80 and are respectively secured inside the core terminals 5, 30, 80, allow the tubular high current female terminals 52 to respectively mate at substantially 90° with the core terminals 30, 80.

Figure 11:
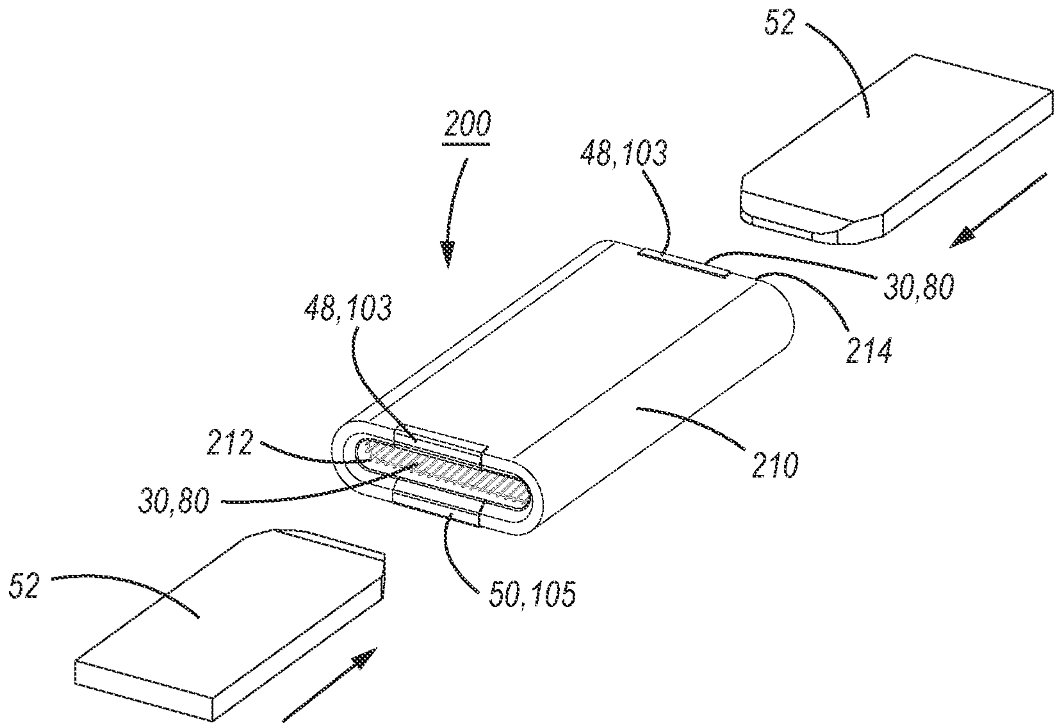
FIG. 11 is an exploded view of a second embodiment of the tubular high current female terminal of this invention showing elongated mating portions at opposing ends thereof with the elongated blade type male terminals to be respectively inserted at a 180° mating direction into the elongated mating portions of the outer terminals.

A second embodiment of the tubular high current female terminal 200 of this invention, as shown in FIG. 11, is a single uniform outer terminal 210 having substantially symmetrical opposite ends each end having an elongated opening 212, 214 for 1800 mating with two opposing elongated blade type male terminals 52. Accommodated within the tubular current female terminal 200 are two core terminals 5, 30, 80 (shown in FIG. 11 is a core terminal of the second type 30 or the third type 80) respectively attached onto the elongated openings 212, 214 with the latches 48, 50 or latches 103, 105 (see, FIGS. 6 and 7). The tubular high current female terminal 200 is shown in FIG. 11 in a 180° mating state with two elongated blade type male terminals 52, which respectively enter the opposing elongated openings 212, 214 of the single uniform outer terminal 210. Although the core terminals 5, 30, 80 are described in the second embodiment of the tubular high current female terminal 200 of this invention as being two core terminals 5, 30, 80, each core terminal 5, 30, 80 can also be a single core terminal 5, 30, 80 contacting both elongated blade type male terminals 52 from opposite mating portions respectively having the opposing elongated openings 212, 214.

Figure 12A:
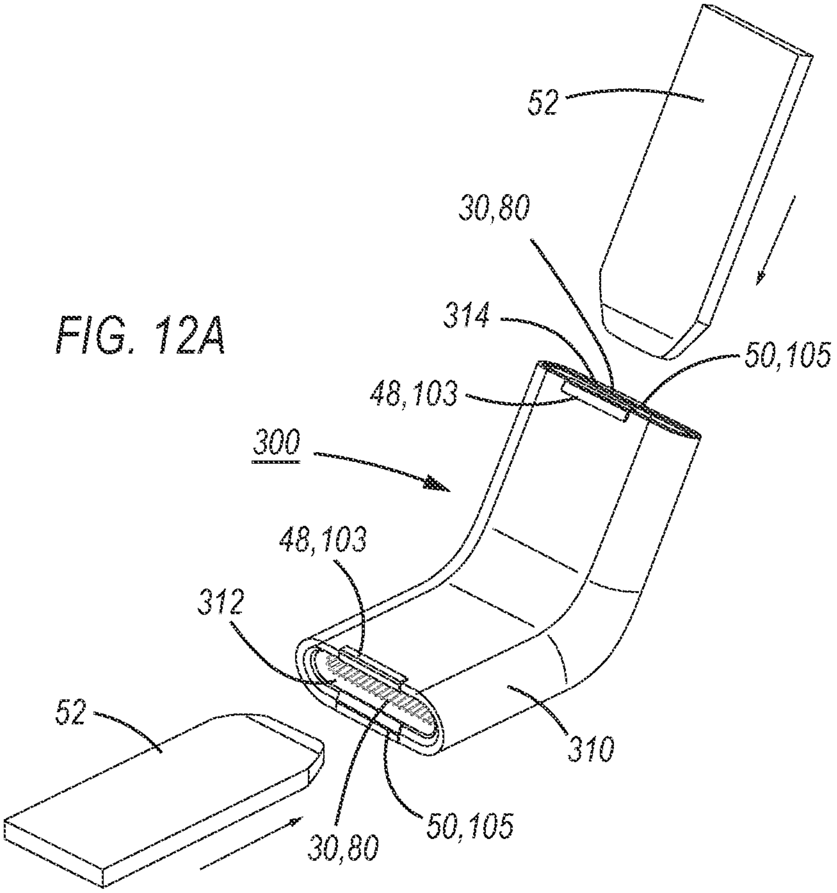
FIG. 12A is an exploded view of a third embodiment of the tubular high current female terminal of this invention showing elongated mating portions at opposing ends thereof with the elongated blade type male terminals to be respectively inserted at any pre-set angle mating direction into the elongated mating portions of the outer terminals.

A third embodiment of the tubular high current female terminal 300 of this invention, as shown in FIG. 12A, is also a single piece outer terminal 310 having substantially symmetrical opposite ends each end having an elongated opening 312, 314 for mating at any pre-set angle with two opposing elongated blade type male terminals 52. The two symmetrical mating portions respectively having the elongated openings 312, 314 are integrally linked therebetween through the transit portion. Accommodated within the tubular high current female terminal 300 are two core terminals 5, 30, 80 (shown in FIG. 11 is a core terminal 30 of the second type or a core terminal 80 of the third type) respectively attached onto the elongated openings 312, 314 with the latches 48, 50 or latches 103, 105. The tubular high current female terminal 300 is shown in FIG. 12A in any pre-set angle mating state with two elongated blade type male terminals 52, which respectively enter the opposing elongated openings 312, 314 of the single piece outer terminal 310.

Figure 12B:
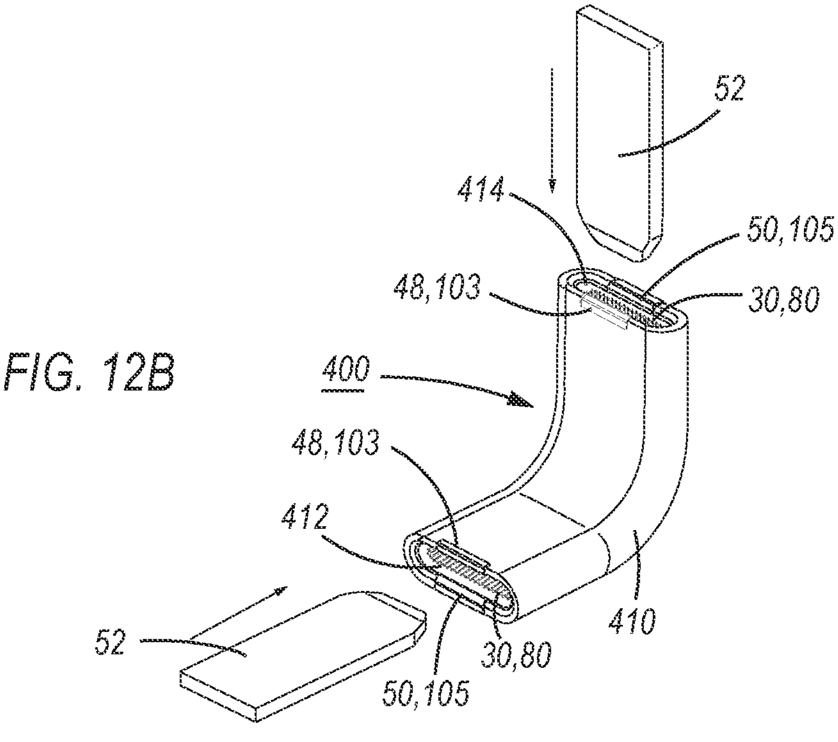
FIG. 12B is an exploded view of a fourth embodiment of the tubular high current female terminal of this invention showing elongated mating portions at opposing ends thereof with the elongated blade type male terminals to be respectively inserted at a substantially 90° angle mating direction into the elongated mating portions of the outer terminals.

A fourth embodiment of the tubular high current female terminal 400 of this invention, as shown in FIG. 12B, is yet another single piece outer terminal 410 having substantially symmetrical opposite ends each end having an elongated opening 412, 414 for mating at a substantially 90° angle with two opposing elongated blade type male terminals 52. The two symmetrical mating portions respectively having the elongated openings 412, 414 are integrally linked therebetween through the transit portion. Accommodated within the tubular current female terminal 400 are two core terminals 5, 30, 80 (shown in FIG. 12B is a core terminal 30 of the second type or a core terminal 80 of the third type) respectively attached onto the elongated openings 412, 414 with the latches 48, 50 or latches 103, 105 (see, FIGS. 6 and 7). The tubular high current female terminal 400 is shown in FIG. 12B in a pre-set substantially 90-degree angle mating state with two elongated blade type male terminals 52, which respectively enter the opposing elongated openings 412, 414 of the single piece outer terminal 410.

As discussed above in the second embodiment of the tubular high current female terminal 200, in the third embodiment 300 (FIG. 12A) and fourth embodiment 400 (FIG. 12B) of the high current female terminal of this invention, each core terminal 5, 30, 80 can similarly be a single core terminal 5, 30, 80 contacting both elongated blade type male terminals 52 from opposite mating portions respectively having the opposing elongated openings 312, 314 or opposing elongated openings 412, 414.

Figure 13:
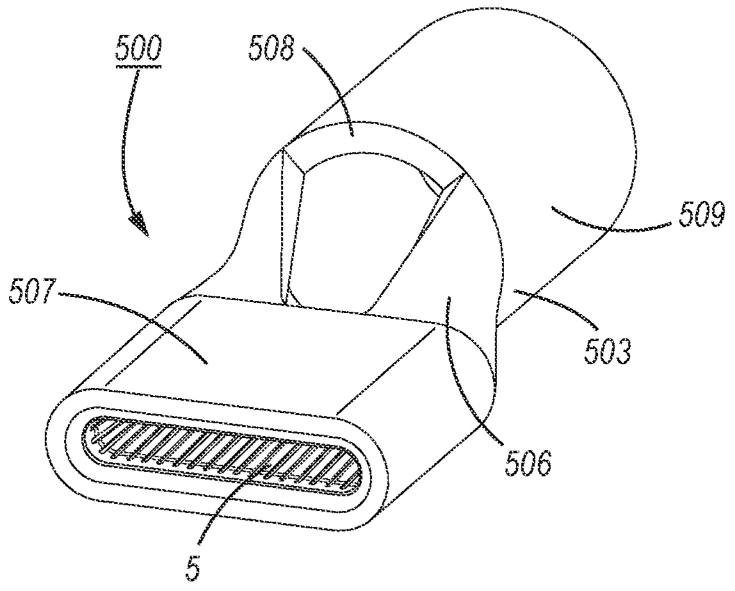
FIG. 13 is a perspective view of a fifth embodiment of the tubular high current female terminal of this invention showing the termination portion of the outer terminal in the form of a cylindric tube, the cylindrical portion of the termination portion attachable to a high voltage cable by crimping.

A fifth embodiment of the tubular high current female terminal, generally referred to as reference number 500 and as shown in FIG. 13, includes an outer terminal 503 and the core terminal 5. Although the core terminal 5 of the first type is shown in FIG. 13, the core terminals 30, 80 of the second and third types are similarly applicable. The outer terminal 503 includes an elongated mating portion 507, which is structured substantially similarly as the elongated mating portion 7 of the first embodiment of the tubular high current female terminal 1. The termination portion 509, however, of this fifth embodiment of the tubular high current female terminal 500 is in the form of a cylindric tube attachable to an electric cable by, e.g., crimping. The elongated mating portion 507 and the termination portion 509 are integrally linked therebetween through a transit portion 506. Material cut-out 508 in the transit portion 506 is to ease and facilitate the forming process of the mating portion 507 and termination portion 509 with different profiles in the manufacturing of the outer terminal 503.

Figure 14:
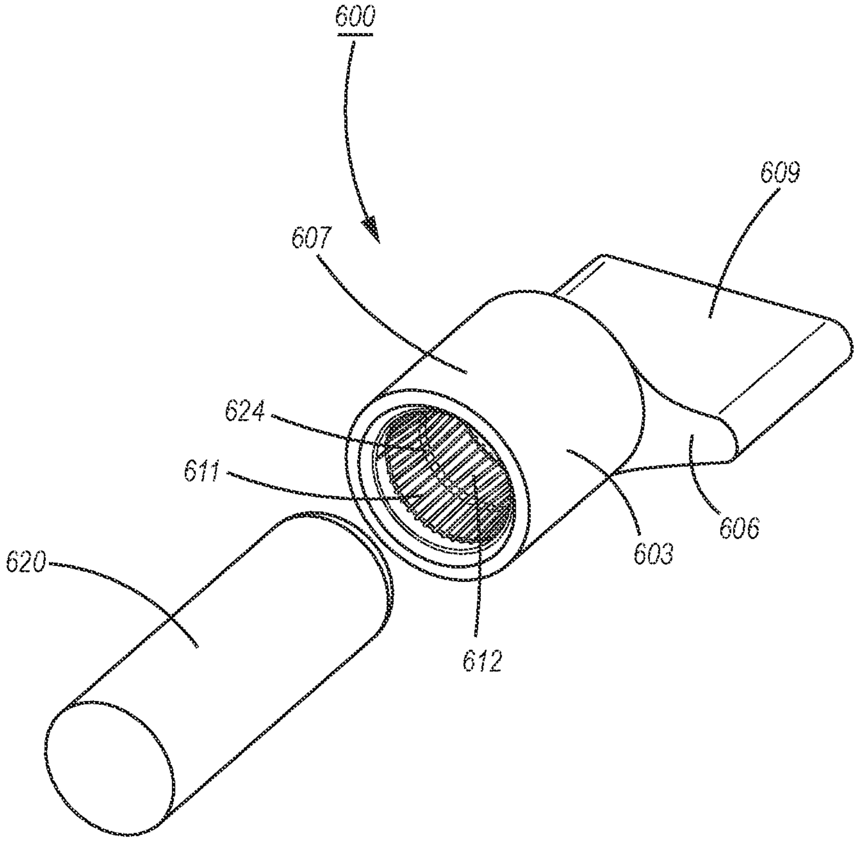
FIG. 14 is an exploded view of the sixth embodiment of the tubular high current female terminal of this invention showing the tubular mating portion in the form of a cylindric tube for receiving therein a cylindric type male terminal, and further showing the termination portion of the outer terminal attachable to a high voltage cable or an electric conductor (e.g., a busbar terminal or the like).

A sixth embodiment of the tubular high current female terminal, generally referred to as reference number 600 and as shown in FIG. 14, includes an outer terminal 603 and a core terminal 611 of a fourth type. The outer terminal 603 includes an extended cylindrical mating portion 607 and a termination portion 609. It is preferable that the extended cylindrical mating portion 607 and the termination portion 609 are integrally linked therebetween through a transit portion 606. The extended cylindrical mating portion 607 has a substantially circular opening 612 for allowing the core terminal 611 of the fourth type to pass therethrough so as to ultimately be accommodated within the extended cylindrical mating portion 607. As in the core terminals 5, 30, 80, the core terminal 603 is preferably stamped and folded in a circular form so as to pass through the circular opening 612 of the extended cylindrical mating portion 607 and be accommodated therein. An extended cylindric type male terminal 620 is inserted into the circular opening 612 of the extended cylindrical mating portion 607 so as to mate with the core terminal 611 attached therein. The termination portion 609 is attachable to an electric cable or an electric conductor (e.g., a busbar terminal, or the like) by welding, crimping, or mechanical fastening.

The high current female terminal 600 is of a tubular design with an overall profile that can be readily pre-formed with high precision and pre-formed to fit therein the extended cylindric type male terminal 620. The outer terminal 603 is preferably a single-piece, low profile, and robust structure or configuration to support and protect the core terminal 611. The outer terminal 603 is also preferably made of a pre-formed tube without the need for machining, which, as mentioned earlier, is inefficient and low in productivity. The core terminal 611 includes a plurality of spring contacts 624; and the core terminal 611 is preferably folded and configured so as to match and fit inside the circular opening 612 of the extended cylindrical mating portion 607 of the outer terminal 603.

The present invention is not limited to the above-described embodiments; and various modifications in design, structural arrangement or the like may be used without departing from the scope or equivalents of the present invention.

I claim:

1. A tubular high current female terminal for mating with an elongated male terminal, comprising:

an outer terminal extending along a longitudinal axis thereof and entirely made of a substantially seamless one-piece pre-formed tube having an elongated mating portion and a termination portion, said elongated mating portion having an elongated opening that extends substantially perpendicular to said longitudinal axis; and at least one core terminal having a plurality of spring contacts and contiguously extending, in its entirety, between longitudinal sides of said elongated opening of said outer terminal for mating with said elongated male terminal, wherein said elongated mating portion accommodates therein through said elongated opening thereof an elongated blade type male terminal, wherein said contiguously extending spring contacts include at least a spring beam, which acts as a contact point between said core terminal and said elongated blade type male terminal, and wherein said termination portion receives on a side thereof at least one of an electric cable and an electric component.

2. The tubular high current female terminal for mating with said elongated male terminal according to claim 1, wherein said outer terminal comprises a seamless elongated mating portion and a termination portion integrally extending therebetween, wherein said elongated mating portion includes therein said at least one core terminal for mating with said elongated male terminal.

3. The tubular high current female terminal for mating with the elongated male terminal according to claim 1, wherein said outer terminal extends from a mating portion integrally extending to said termination portion as a single piece.

4. The tubular high current female terminal for mating with the elongated male terminal according to claim 1, wherein said core terminal includes a plurality of spring contacts, and latches for attaching thereof onto said elongated opening of said outer terminal.

5. The tubular high current female terminal for mating with the elongated male terminal according to claim 1, wherein said core terminal contacts with an elongated shape portion of said elongated terminal of said male terminal.

6. The tubular high current female terminal for mating with said elongated male terminal according to claim 2, wherein said termination portion connects with at least an electric conductor by one of welding, crimping, and mechanical fastening.

7. A plurality of tubular high current female terminals, each for mating with a corresponding one of an elongated male terminal, comprising at least:

a first outer terminal extending along a first longitudinal axis thereof and entirely made of a substantially seamless one-piece pre-formed tube having an elongated first opening that extends substantially perpendicular to said first longitudinal axis, and at least one first core terminal having a plurality of spring contacts and contiguously extending, its entirety, between longitudinal sides of said elongated first opening of said first outer terminal for mating with a first elongated male terminal; and a second outer terminal extending along a second longitudinal axis thereof and entirely made of a substantially seamless one-piece pre-formed tube having an elongated second opening that extends substantially perpendicular to said second longitudinal axis, and at least one second core terminal having a plurality of spring contacts and contiguously extending, in its entirety, between longitudinal sides of said elongated second opening of said second outer terminal for mating with a second elongated male terminal, wherein a first elongated mating portion accommodates therein through said first elongated opening thereof a first elongated blade type male terminal, wherein a second elongated mating portion accommodates therein through said second elongated opening thereof a second elongated blade type male terminal, wherein said first outer terminal comprises a first elongated mating portion and a first termination portion integrally extending therebetween, wherein said first elongated mating portion includes therein said at least one first core terminal for mating with said first elongated male terminal, wherein said second outer terminal comprises a second elongated mating portion and a second termination portion integrally extending therebetween, wherein said second elongated mating portion includes therein said at least one second core terminal for mating with said second elongated male terminal, and wherein said first termination portion and said second termination portion are joined together.

8. The plurality of tubular high current female terminals according to claim 7, wherein said first termination portion and said second termination portion are joined together by one of welding and mechanical fastening.

9. A tubular high current female terminal for mating with at least two elongated male terminals, comprising:

an outer terminal extending along a longitudinal axis thereof and entirely made of a substantially seamless one-piece pre-formed tube having a first elongated opening and second elongated opening at opposing ends thereof, each of said first elongated opening and said second elongated opening extending substantially perpendicular to said longitudinal axis;

a first core terminal having a plurality of spring contacts and contiguously extending, in its entirety, between longitudinal sides of said first elongated opening of said outer terminal for mating with a first elongated male terminal;

a second core terminal having a plurality of spring contacts and contiguously extending, in its entirety, between longitudinal sides of said second elongated opening of said outer terminal for mating with a second elongated male terminal, wherein each of said contiguously extending spring contacts of said first and second core terminals includes at least a spring beam, which respectively acts as a contact point between said first and second core terminals and said first and second elongated male terminals, and wherein said first and second elongated openings are connected at opposing ends of said outer terminal in an in-line connection and respectively receiving therein said first and second elongated male terminals, said first and second male terminals respectively extending from opposing ends of said outer terminal.

10. The tubular high current female terminal for mating with at least two elongated male terminals according to claim 9, wherein said outer terminal is a seamless preformed tube extending from said first elongated opening to said second elongated opening as a single piece.

11. The tubular high current female terminal for mating with the elongated male terminal according to claim 9, wherein each of said first core terminal and said second core terminals includes a plurality of spring contacts, and latches for respectively attaching thereof onto said first and second elongated openings of said outer terminal.

12. A tubular high current female terminal for mating with at least two elongated male terminals, comprising:

an outer terminal extending along a longitudinal axis thereof and entirely made of a substantially seamless one-piece pre-formed tube having a first elongated opening and second elongated opening at opposing ends thereof, each of said first elongated opening and said second elongated opening extending substantially perpendicular to said longitudinal axis;

a first core terminal having a plurality of spring contacts and contiguously extending, in its entirety, between longitudinal sides of said first elongated opening of said outer terminal for receiving therein and mating with a first elongated male terminal;

a second core terminal having a plurality of spring contacts and contiguously extending, in its entirety, between longitudinal sides of said second elongated opening of said outer terminal for receiving therein and mating with a second elongated male terminal, wherein each of said contiguously extending spring contacts of said first and second core terminals includes at least a spring beam, which respectively acts as a contact point between said first and second core terminals and said first and second elongated male terminals, wherein said first and second elongated openings are connected at opposing ends of said outer terminal in a none in-line connection with said first and second elongated male terminals extending from opposing ends of said outer terminal.

13. The tubular high current female terminal for mating with at least two elongated male terminals according to claim 12, wherein said first and second elongated openings are connected at opposing ends of said outer terminal in a substantially perpendicular connection with said first and second elongated male terminals extending from opposing ends of said outer terminal.

14. The tubular high current female terminal for mating with at least two elongated male terminals according to claim 12, wherein said outer terminal is a seamless preformed tube extending from said first elongated opening to said second elongated opening as a single piece.

15. The tubular high current female terminal for mating with a cylindrical male terminal according to claim 1, wherein said outer terminal further comprises a transit portion that extends between said mating portion and said termination portion.

16. The tubular high current female terminal for mating with said cylindrical male terminal according to claim 1, wherein said outer terminal is a seamless preformed tube from said mating portion integrally extending to said termination portion as a single piece.

17. A tubular high current female terminal for mating with an elongated male terminal, comprising:

an outer terminal extending along a longitudinal axis thereof and having an elongated opening that extends substantially perpendicular to said longitudinal axis, said outer terminal being entirely made of a substantially seamless one-piece pre-formed tube; and at least one core terminal having a plurality of spring contacts and contiguously extending, in its entirety, between longitudinal sides of said elongated opening of said outer terminal for mating with said elongated male terminal, wherein said contiguously extending spring contacts include at least a spring beam, which acts as a contact point between said core terminal and said elongated male terminal, wherein said outer terminal comprises an elongated mating portion and a termination portion, wherein said elongated mating portion and said termination portion are integrally connected together, wherein said elongated mating portion includes therein said elongated opening and said at least one core terminal for mating with said elongated male terminal, wherein said termination portion is a cylindric tube attachable, on an outer surface of said cylindric tube by crimping, with at least one of an electric cable and an electric component.

18. The tubular high current female terminal for mating with the elongated male terminal according to claim 17, wherein said outer terminal is a seamless preformed tube from said mating portion integrally extending to said termination portion as a single piece.

19. A tubular high current female terminal for mating with at least two elongated male terminals, comprising:

an outer terminal extending along a longitudinal axis thereof and entirely made of a substantially seamless one-piece pre-formed tube having a first elongated opening and a second elongated opening at opposing ends thereof, each of said first elongated opening and said second elongated opening respectively receiving therein a first elongated male terminal and a second elongated male terminal, each first elongated male terminal and said second elongated male terminal extending substantially perpendicular to said longitudinal axis; and at least one core terminal having a plurality of spring contacts and contiguously extending, in its entirety, between: (a) longitudinal sides of said first elongated opening of said outer terminal for mating with said first elongated male terminal, and (b) longitudinal sides of said second elongated opening of said outer terminal for mating with said second elongated male terminal, wherein each of said contiguously extending spring contacts includes at least a spring beam, which respectively acts as a contact point between said core terminals and said first and second elongated male terminals.

20. The tubular high current female terminal for mating with at least two elongated male terminals according to claim 19, wherein said first and second elongated openings are connected at opposing ends of said outer terminal in an in-line connection with said first and second elongated male terminals extending from opposing ends of said outer terminal.

21. The tubular high current female terminal for mating with at least two elongated male terminals according to claim 19, wherein said first and second elongated openings are connected at opposing ends of said outer terminal in a none in-line connection with said first and second elongated male terminals extending from opposing ends of said outer terminal.

22. The tubular high current female terminal for mating with at least two elongated male terminals according to claim 19, wherein said first and second elongated openings are connected at opposing ends of said outer terminal in a substantially perpendicular connection with said first and second elongated male terminals extending from opposing ends of said outer terminal.

23. A tubular high current female terminal for mating with an elongated male terminal, comprising:

an outer terminal extending along a longitudinal axis thereof and entirely made of a substantially seamless one-piece pre-formed tube having an elongated mating portion and a termination portion, said elongated mating portion having an elongated opening that extends substantially perpendicular to said longitudinal axis; and at least one core terminal having a plurality of spring contacts and contiguously extending, in its entirety, between longitudinal sides of said elongated opening of said outer terminal for mating with said elongated male terminal, wherein said contiguously extending spring contacts include at least a spring beam, which respectively acts as a contact point between said core terminal and said elongated male terminal, wherein said elongated mating portion accommodates therein through said elongated opening thereof said elongated male terminal, and wherein said termination portion receives therein an electric cable.

* * * * *